US008296681B2

(12) United States Patent
Nurmi

(10) Patent No.: US 8,296,681 B2
(45) Date of Patent: Oct. 23, 2012

(54) SEARCHING A LIST BASED UPON USER INPUT

(75) Inventor: Mikko Nurmi, Tampere (FI)

(73) Assignee: Nokia Corporation, Espoo (FI)

( * ) Notice: Subject to any disclaimer, the term of this patent is extended or adjusted under 35 U.S.C. 154(b) by 718 days.

(21) Appl. No.: 11/844,717

(22) Filed: Aug. 24, 2007

(65) Prior Publication Data

US 2009/0055771 A1 Feb. 26, 2009

(51) Int. Cl.
*G06F 3/048* (2006.01)
*G06F 3/033* (2006.01)
(52) U.S. Cl. ............... 715/845; 715/810; 715/863
(58) Field of Classification Search .......... 715/810, 715/845, 863
See application file for complete search history.

(56) References Cited

U.S. PATENT DOCUMENTS

| 5,717,939 | A * | 2/1998 | Bricklin et al. | 715/212 |
| 6,590,568 | B1 * | 7/2003 | Astala et al. | 345/173 |
| 7,336,828 | B2 * | 2/2008 | Pettiross et al. | 382/187 |
| 2004/0268250 | A1 * | 12/2004 | Danker et al. | 715/526 |
| 2005/0022130 | A1 * | 1/2005 | Fabritius | 715/739 |
| 2005/0210020 | A1 * | 9/2005 | Gunn et al. | 707/3 |
| 2006/0018546 | A1 * | 1/2006 | Lagardere et al. | 382/186 |
| 2006/0227065 | A1 | 10/2006 | Yukawa et al. | |
| 2006/0262103 | A1 | 11/2006 | Hu et al. | |
| 2008/0235621 | A1 * | 9/2008 | Boillot | 715/810 |
| 2008/0301542 | A1 * | 12/2008 | McGee et al. | 715/220 |

FOREIGN PATENT DOCUMENTS

WO WO 2005/003944 A1 1/2005

OTHER PUBLICATIONS

Charles Tappert, Ching Suen, Toru Wakahara "The State of the Art in On-Line Handwriting Recognition" IEEE Transactions of Pattern Analysis and Machine Intelligence vol. 12, No. 8, Aug. 1990 pp. 787-808.*
Ken Hinckley, Shengdong Zhao, Raman Sarin, Patrick Baudisch, Ed Cutrell, Michael Shilman, Desney Tan "InkSeine: In Situ Search for Active Note Taking" CHI 2007 Proceedings Task & Attention Apr. 28-May 3, 2007 p. 251-260.*
Mary J. LaLomia, Karen C. Cohen "Gesture Consistency for Text, Spreadsheet, Graphic and Form Fill Editing" SIGCHI Bulletin Oct. 1991 vol. 23, No. 4 pp. 40-41.*
The Linux Information Project LINFO "Drag-and-drop Definition" Jul. 26, 2005.*
How do touchscreen monitors know where you're touching? Copyright 1998-2003.*

(Continued)

*Primary Examiner* — Adam M Queler
*Assistant Examiner* — Andrea Long
(74) *Attorney, Agent, or Firm* — Alston & Bird LLP

(57) ABSTRACT

An apparatus, comprising: a user output device configured to display a first plurality of items from a list of items, each item having data portions in fields; a user input device configured to enable a user to select at least one character from a plurality of selectable characters and to associate the selected at least one character with a field; and processing circuitry configured to control the user output device to display a second plurality of items, the second plurality of items being selected from the list of items and ordered, wherein the selection and ordering is in dependence upon a comparison between the selected at least one character and the data portion that each item has in the associated field.

17 Claims, 10 Drawing Sheets

OTHER PUBLICATIONS

Martinez, AE, Martinez, SJ, Roberts, J, *Pen-Based Automated Interpersonal Communication System*, IP.Com Journal, IP.Com Inc., West Henrietta, NY, Mar. 1, 1995, pp. 298-300, XP013103091, ISSN: 1533-0001.

International Search Report for PCT/EP2008/059958, dated Nov. 5, 2008.

European Search Report mailed Sep. 27, 2010, for EP Application No. 10 16 7231.

Office Action for Russian Application No. 2010111037/08(015531) dated Jun. 15, 2011.

Dorot, V., *Tolkoviy Slovar Sovremennoy Kompiuternoy Tekhniki*, Dictionary of Modern Computer Terms, (undated), pp. 364-365.

\* cited by examiner

FIG. 9

SEARCHING A LIST BASED UPON USER INPUT

FIELD OF THE INVENTION

Embodiments of the present invention relate to searching. In particular, they relate to an apparatus, method, computer program and a user interface for searching through items in a list by re-ordering the list.

BACKGROUND TO THE INVENTION

The number of features that are integrated into a single electronic apparatus has been increasing in recent years. This has been particularly evident in the case of mobile radiotelephones and computers.

The increase in the number of features has been accompanied by an increase in the amount of data that is stored in a single apparatus. In order to access a particular portion of the stored data, a user may wish to sort through the data stored by the apparatus using an appropriate searching method.

BRIEF DESCRIPTION OF VARIOUS EMBODIMENTS OF THE INVENTION

According to various embodiments of the invention there is provided an apparatus, comprising: a user output device configured to display a first plurality of items from a list of items, each item having data portions in fields; a user input device configured to enable a user to select at least one character from a plurality of selectable characters and to associate the selected at least one character with a field, and processing circuitry configured to control the user output device to display a second plurality of items, the second plurality of items being selected from the list of items, wherein the selection is in dependence upon a comparison between the selected at least one character and the data portion that each item has in the associated field.

According to various embodiments of the invention there is provided a method, comprising: displaying a first plurality of items from a list of items, each item having data portions in fields; detecting the selection of at least one character from a plurality of selectable characters, the selection associating the selected character with a field; comparing the detected at least one character with the data portion that each item has in the associated field; and displaying a second plurality of items, the second plurality of items being selected from the list of items, the selection and ordering being in dependence upon the comparison.

According to various embodiments of the invention there is provided an apparatus, comprising: means for displaying a first plurality of items from a list of items, each item having data portions in fields; means for enabling a user to select at least one character from a plurality of selectable characters and to associate the at least one selected character with a field; and control means, for controlling the means for displaying to display a second plurality of items, the second plurality of items being selected from the list of items, wherein the selection is in dependence upon a comparison between the selected at least one character and the data portion that each item has in the associated field.

According to various embodiments of the invention there is provided a computer program, comprising: instructions for displaying a first plurality of items from a list of items, each item having data portions in fields; instructions for detecting the selection of at least one character from a plurality of selectable characters, the selection associating the selected character with a field; instructions for comparing the detected at least one character with the data portion that each item has in the associated field; and instructions for displaying a second plurality of items, the second plurality of items being selected from the list of items, the selection and ordering being in dependence upon the comparison.

According to various embodiments of the invention there is provided a graphical user interface, comprising: a user output device configured to display a first plurality of items from a list of items, each item having data portions in fields; a user input device configured to enable a user to select at least one character from a plurality of selectable characters, and to enable the user to associate the selected at least one character with a field, wherein in response to the selection of the at least one character, the user output device displays a second plurality of items, the second plurality of items being selected from the list of items, in dependence upon the selected at least one character and the data portion that each item has in the associated field.

BRIEF DESCRIPTION OF THE DRAWINGS

For a better understanding of various embodiments of the present invention reference will now be made by way of example only to the accompanying drawings in which:

FIG. 9 illustrates the apparatus displaying a list of items in dependence upon first, second and third selected characters and their associated fields.

DETAILED DESCRIPTION OF VARIOUS EMBODIMENTS OF THE INVENTION

Figure 1:
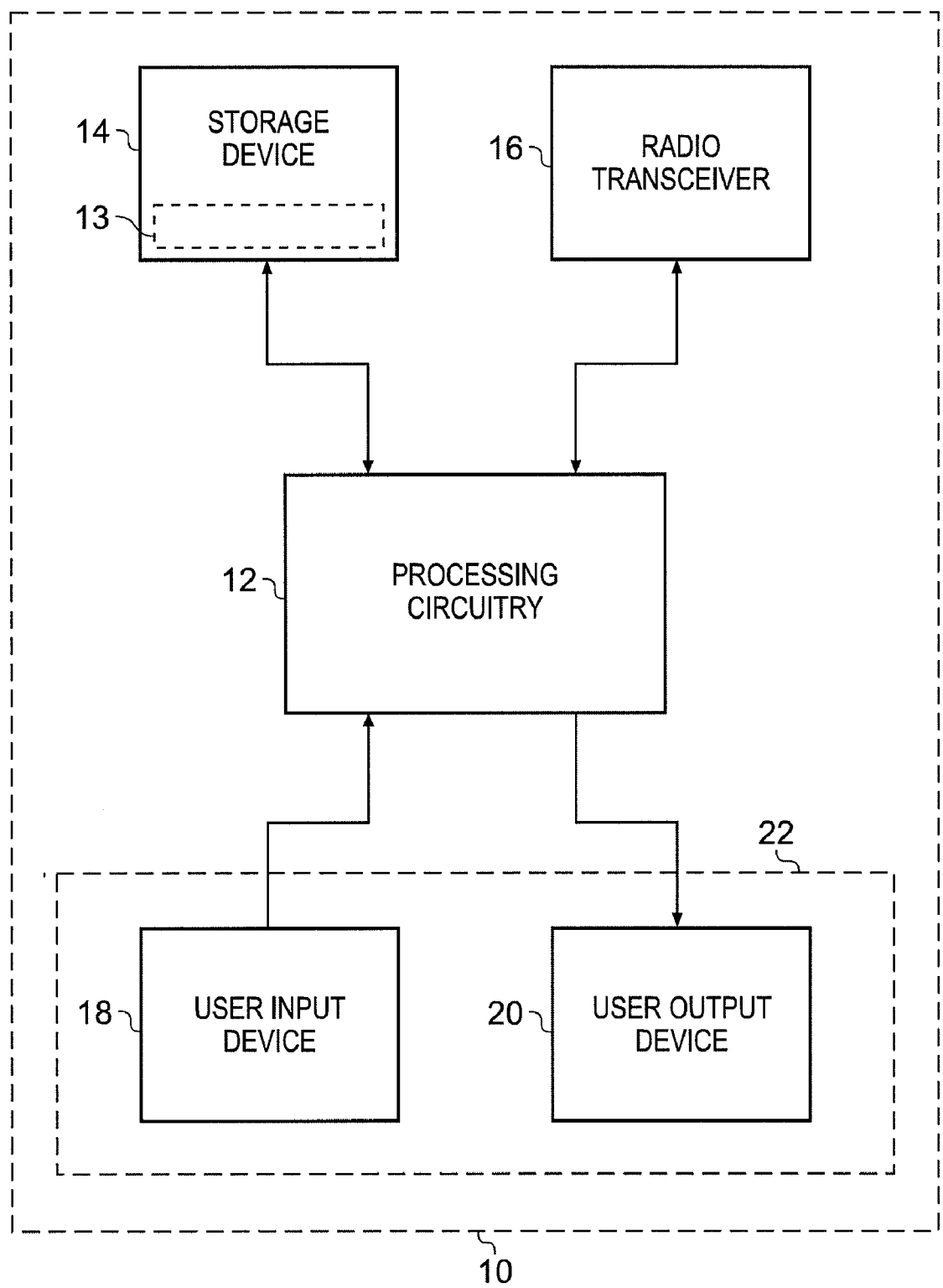
FIG. 1 illustrates an apparatus.
Figure 1:
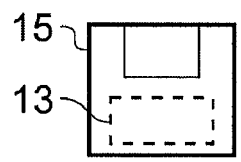

The Figures illustrate an apparatus 10, comprising: means, such as a user output device 20, configured to display a first plurality of items from a list of items 275, each item having data portions in fields; means, such as a user input device 18, configured to enable a user to select at least one character from a plurality of selectable characters and to associate the selected at least one character with a field, and control means, such as processing circuitry 12, configured to control the user output device 20 to display a second plurality of items, the second plurality of items being selected from the list of items 275, wherein the selection and ordering is in dependence upon a comparison between the selected at least one character and the data portion that each item has in the associated field.

A character may be an alphanumeric character or a symbol, or may be any shape, including shapes created by a drawing action, manual movement or a manual gesture detect by the user input device 18. Movements and gestures, in particular, but also other characters may be associated as shortcuts for particular inputs. For example, a particular gesture may be interpreted as a shortcut for entering an associated name.

FIG. 1 illustrates a schematic of an apparatus 10. The apparatus 10 may, for example, be a hand portable electronic device such as a mobile radiotelephone. The apparatus 10 comprises processing circuitry 12, a storage device 14, a radio transceiver 16, a user input device 18 and a user output device 20.

The processing circuitry 12 may be any type of processing circuitry. For example, the processing circuitry 12 may be a programmable processor that interprets computer program instructions 13 and processes data. Alternatively, the processing circuitry 12 may be, for example, programmable hardware with embedded firmware. The processing circuitry 12 may be a single integrated circuit or a set of integrated circuits (i.e. a chipset). The processing circuitry 12 may also be a hardwired, application-specific integrated circuit (ASIC).

The processing circuitry 12 is operable to receive an input from and provide an output to the radio transceiver 16. The radio transceiver 16 is configured to transmit and receive cellular telephone signals and enables the apparatus 10 to operate as a mobile cellular radiotelephone.

The processing circuitry 12 is connected to write to and read from the storage device 14. The storage device 14 may be a single memory unit or a plurality of memory units.

The storage device 14 may store computer program instructions 13 that control the operation of the apparatus 10 when loaded into processing circuitry. The computer program instructions 13 may provide the logic and routines that enables the apparatus to perform the method illustrated in FIG. 2.

The computer program instructions 13 may arrive at the apparatus 10 via an electromagnetic carrier signal or be copied from a physical entity 15 such as a computer program product, a memory device or a record medium such as a CD-ROM or DVD.

The computer program instructions provide: instructions for displaying a first plurality of items from a list of items, each item having data portions in fields; instructions for detecting the selection of at least one character from a plurality of selectable characters, the selection associating the selected character with a field; instructions for comparing the detected at least one character with the data portion that each item has in the associated field; and instructions for displaying a second plurality of items, the second plurality of items being selected from the list of items, the selection being in dependence upon the comparison.

The processing circuitry 12 is connected to receive an input from the user input device 18. The processing circuitry 12 is also connected to provide an output to the user output device 20. The user output device 20 is for conveying information to a user and may be, for example, a display device. The user input device 18 and the user output device 20 together form a user interface 22. The user interface 22 may be provided as a single unit, such as a touch screen display device. For example, a user may provide an input to the touch screen display device using a digit or a stylus.

In the description below, the user interface 22 is described as being a touch screen display device 22 for ease of explanation. Many touch screen technologies are known. These include technologies based on resistive, inductive and impactive techniques. Some touch screens only recognize taps (often by means of a stylus) as means of selection or input. Others will respond to movement as well as actuation at a single point, thus allowing gestures and movement to be used. So called multi-touch screens can be touched in multiple locations at the same time. For example, a user can press the screen with two fingers, simultaneously, and both presses are detected and used as part of the input. However, it will be recognized by the person skilled in the art that in various embodiments of the invention, a touch screen display device 22 need not be used and instead an alternative user input device 18 and/or an alternative user output device 20 may be used. For example, the user input device 18 may be a keypad and the user output device 20 may be a display device without a touch input feature.

Figure 2:
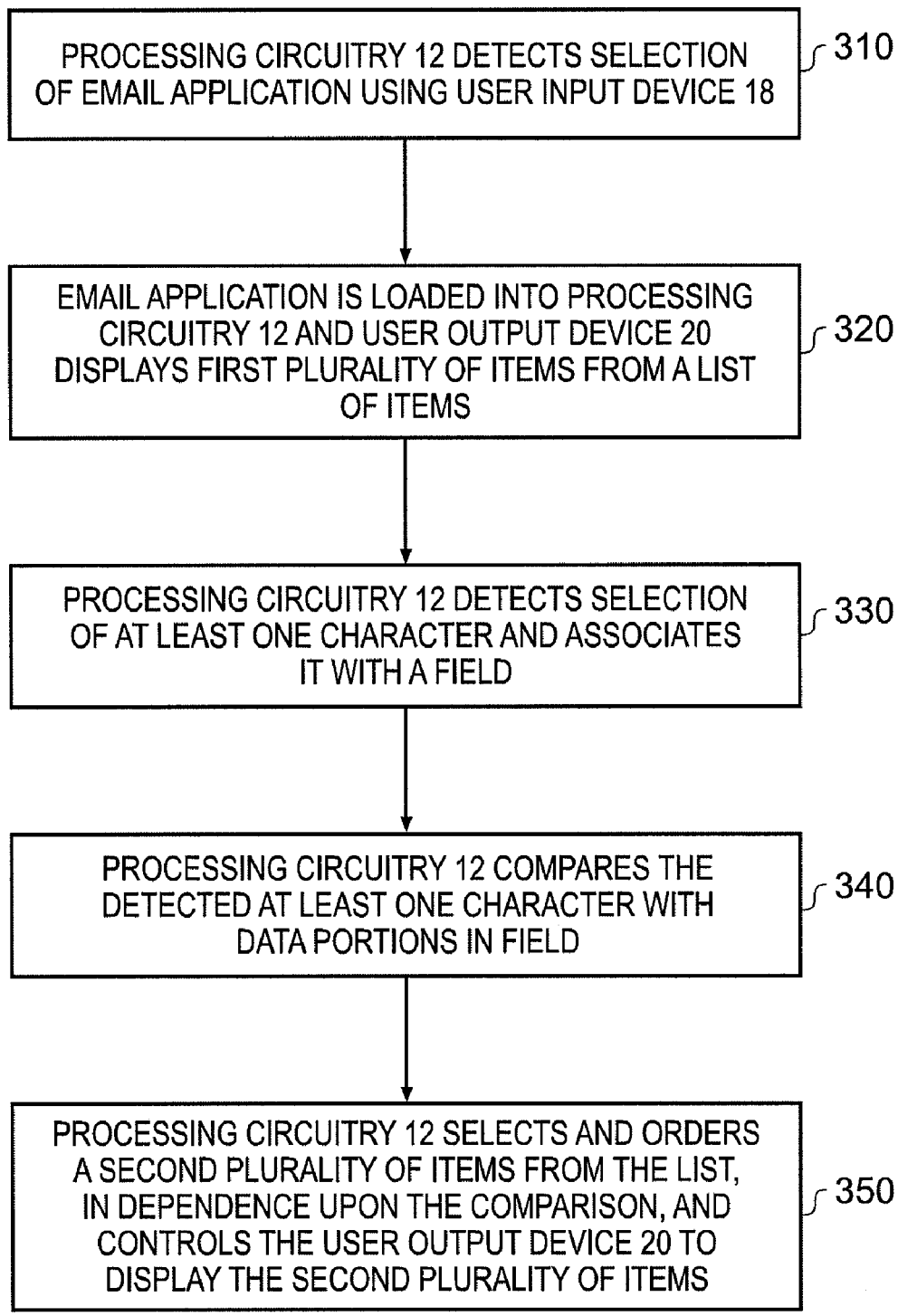
FIG. 2 illustrates a block diagram of a method.

FIG. 2 illustrates a block diagram of a method. The blocks 310, 320, 330, 340 and 350 illustrated in FIG. 2 may represent steps in a method and/or sections of code in the computer program 13. The illustration of a particular order to the blocks does not necessarily imply that there is a required or preferred order for the blocks and the order and arrangement of the blocks may be varied.

At block 310, a user indicates that he wishes to access an email application stored in the storage device 14 of the apparatus 10 by making an appropriate selection using the touch screen display device 22. The processing circuitry 12 detects the selection of the email application by the user.

At block 320, the processing circuitry 12 retrieves the email application from the storage device 14 and controls the touch screen display device 22 to display an inbox relating to the email application.

Figure 3:
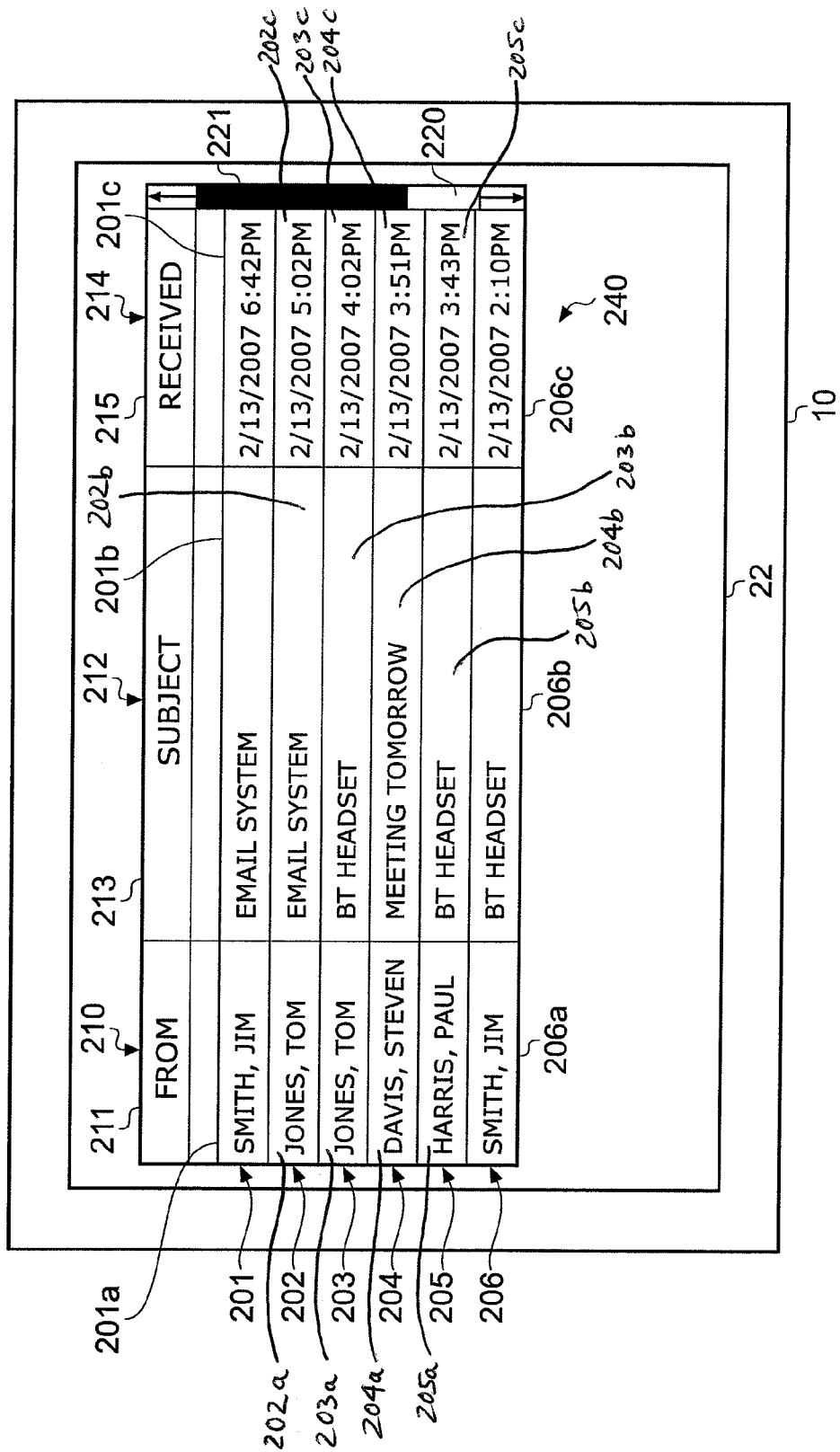
FIG. 3 illustrates the apparatus displaying a list of items from an underlying list on a touch screen display device.

FIG. 3 illustrates a plurality of items 201-206 being displayed on the touch screen display device 22 in a list 240. Each item 201-206 relates to an email that has been received by the apparatus 10 and is stored in the storage device 14.

Each item includes a data portion in each one of a plurality of fields 210, 212, 214. In the embodiment illustrated in FIG. 3, the fields displayed as icons on the display device 22 are "From" 210, "Subject" 212 and "Received" 214. For example, item 201 has a data portion 201a corresponding to the text "Smith, Jim" in the "From" field 210, which relates the sender of the email. Item 201 has a data portion 201b corresponding to "Email System" in the "Subject" field 212, which relates to the subject of the email. Item 201 has a data portion 201c corresponding to the text "2/13/2007 6:42 PM" in the "Received" field 214, which relates to the date and time that the email was received by the apparatus 10. The data portions of the other items/emails may be numbered with corresponding reference numerals. However, for clarity, only the reference numerals 201a, 201b, 201c and 206a, 206b and 206c are shown in FIG. 3.

The plurality of items 201-206 are displayed as a list 240 on the display device 22. Text corresponding to the data portions 201a-206a in the "From" field 210 is displayed by the display device 22 beneath a "From" icon 211. Similarly, text corresponding to the data portions 201b-206b in the "Subject" field 212 is displayed beneath a "Subject" icon 213 and text corresponding to the data portions 201c-206c in the "Received" field 214 is displayed beneath a "Received" icon 215.

In FIG. 3, the data in each field is text. In this, and any other examples, a field may include other data representing other types of information, such as an image, picture or symbol.

In FIG. 3, the plurality of items 201-206 is ordered in a list 240 according to when they were received by the apparatus 10. The uppermost item, item 201, was received at a later point in time than any of the other items 202-206. The later the time of receipt, the higher in the displayed list 240 an item is positioned.

Figure 4:
FIG. 4 illustrates the underlying list.

The plurality of items 201-206 that are illustrated as being displayed on the display device 22 may be a subset of a larger, underlying list 275 of items/emails. FIG. 4 illustrates the underlying list 275 of items.

The underlying list 275 forms the basis of the displayed list 240. The underlying list 275 includes all of the items in the displayed list 240 and may include further items that are not in the displayed list 240. In the illustrated example, the underlying list 275 includes two further items 207, 208. The proportion of the total number of items in the underlying list that are displayed in the displayed list 240 by the display device 22 at any one point in time may depend upon a number of factors, including the size of the underlying list 275, the size of the display device 22 and the settings of the apparatus 10 (e.g. relating to the size of displayed text).

In the example illustrated in FIGS. 3 and 4, item 201 is the uppermost item in the displayed list 240. Downwards movement of a scroll tab 221 within a scroll bar 220 results in items from the upper part of the displayed list 240 sequentially ceasing to be displayed (i.e. items disappear from the displayed list 240 in the order 201 to 206), and being replaced by other items 207, 208 from the underlying list 275.

For example, if the user scrolls downwards such that item 201 (for which Jim Smith is the sender) is no longer displayed by the display device 22, item 201 will be removed from the displayed list 240 and another item 207 (for which Andrew Cox is the sender) will be added to the displayed list 240 from the underlying list 275. Downwards movement of the scroll tab 221 will result in item 207 being displayed at the bottom of the displayed list 240 beneath item 206, and each of the remaining items 202-206 being displayed at a position on the display device 22 that is above the position that it occupies in the FIG. 3 illustration. That is, item 202 will be displayed in the position of item 201 in the FIG. 3 illustration, item 203 will be displayed in the position of item 202, and so on. Scrolling upwards may be provided in a similar manner.

The underlying list 275 only includes eight items 201-208. However, in practice the underlying list 275 may include hundreds or even thousands of items. A user may wish to search through the items to find a particular item, which may, for example, be included in the underlying list 275 but not the displayed list 240.

Embodiments of the invention provide a method in which a user may search through the items in the underlying list 275 by writing on the surface of the touch screen display device 22 to input data in the form of alphanumeric characters, which may be alphanumeric or of other types, as noted above.

Figure 5:
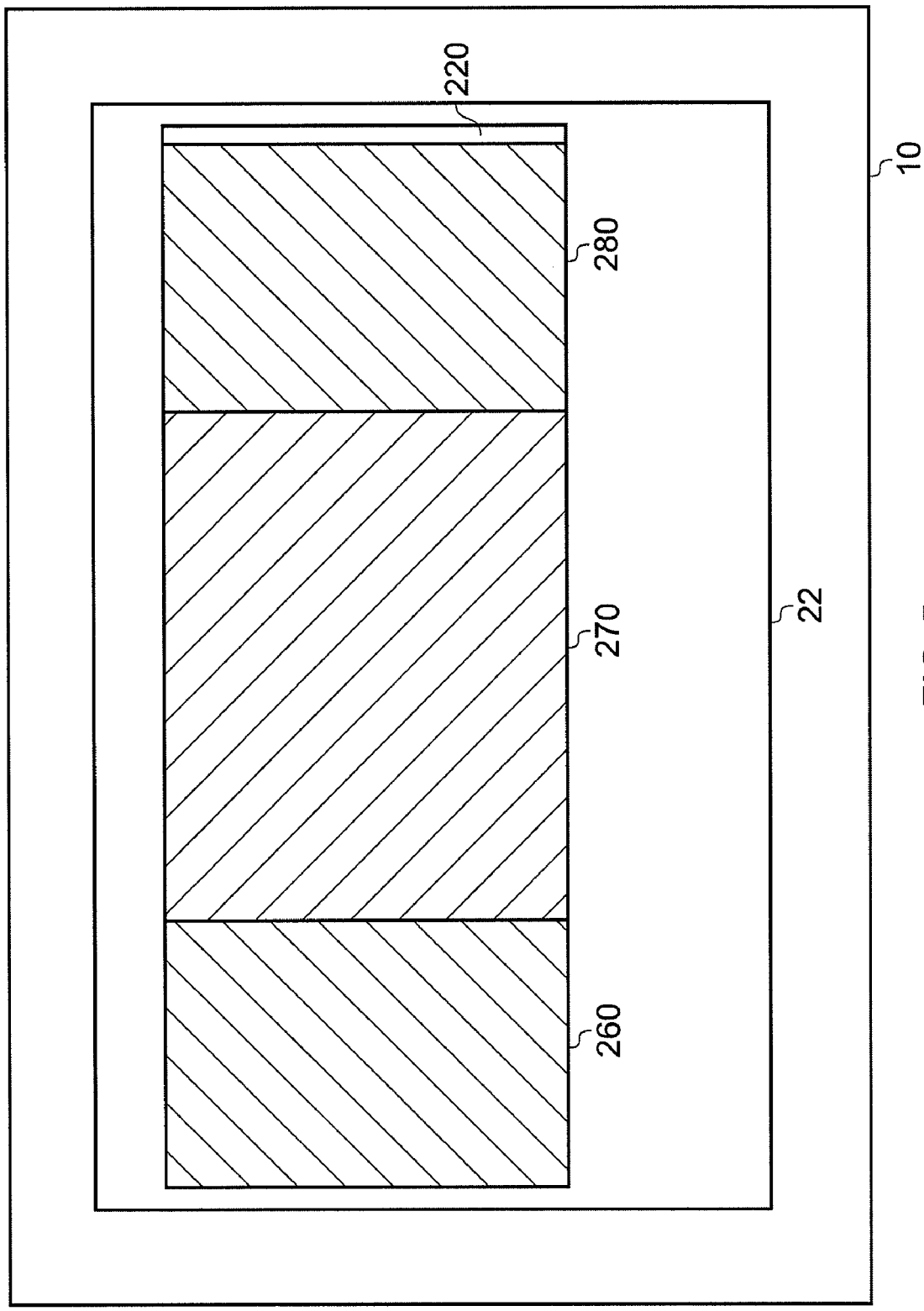
FIG. 5 illustrates portions of the surface of the touch screen display device relating to fields.

FIG. 5 is a schematic illustrating boxes 260, 270 and 280 indicating which parts of the surface area of the touch screen display device 22 the user may write on to re-order the items in the underlying list 275 when the display device 22 is displaying the field information illustrated in FIG. 3. The surface area encompassed by the boxes 260, 270 and 280 may or may not be indicated on the display device 22. For example, the surface area encompassed by the boxes 260, 270 and 280 may display a different background color to the rest of the surface area of the display device 22.

The surface area covered by box 260 relates to the "From" field 210, and encompasses the area corresponding to the "From" icon 211 and the text for data portions 201a, 202a, 203a, 204a, 205a and 206a. The surface area covered by box 270 relates to the "Subject" field 212 and encompasses the area corresponding to the "Subject" icon 213 and the text for data portions 201a, 202b, 203b, 204b, 205b and 206b. The surface area covered by box 280 relates to the "Received" field 214 and encompasses the area corresponding to the "Received" icon 215 and the text for data portions 201c, 202c, 203c, 204c, 205c and 206c.

At block 330 of the method illustrated in FIG. 2, the processing circuitry 12 detects selection of at least one character and associates it with a field.

In one example, a user of the apparatus 10 may choose to input any alphanumeric character from a plurality of selectable alphanumeric characters. The plurality of selectable alphanumeric characters may comprise, for example, letters from the Latin/Roman alphabet and Arabic numerals. The plurality of selectable alphanumeric characters may comprise letters and/or numbers from any language. For example, the plurality of alphanumeric selectable characters may include characters that are not from the Latin/Roman alphabet and are not Arabic numerals, such as characters of Chinese origin, including: traditional Chinese characters, simplified Chinese characters, and characters used in Kanji, Kana, Hangul and Hanja.

In other examples, a user may choose to input another type of character. Examples include symbols or shapes created by a drawing action of the user's finger or a stylus. Shapes or symbols could be created by a manual movement or gesture, such as a movement in a particular direction.

Figure 6:
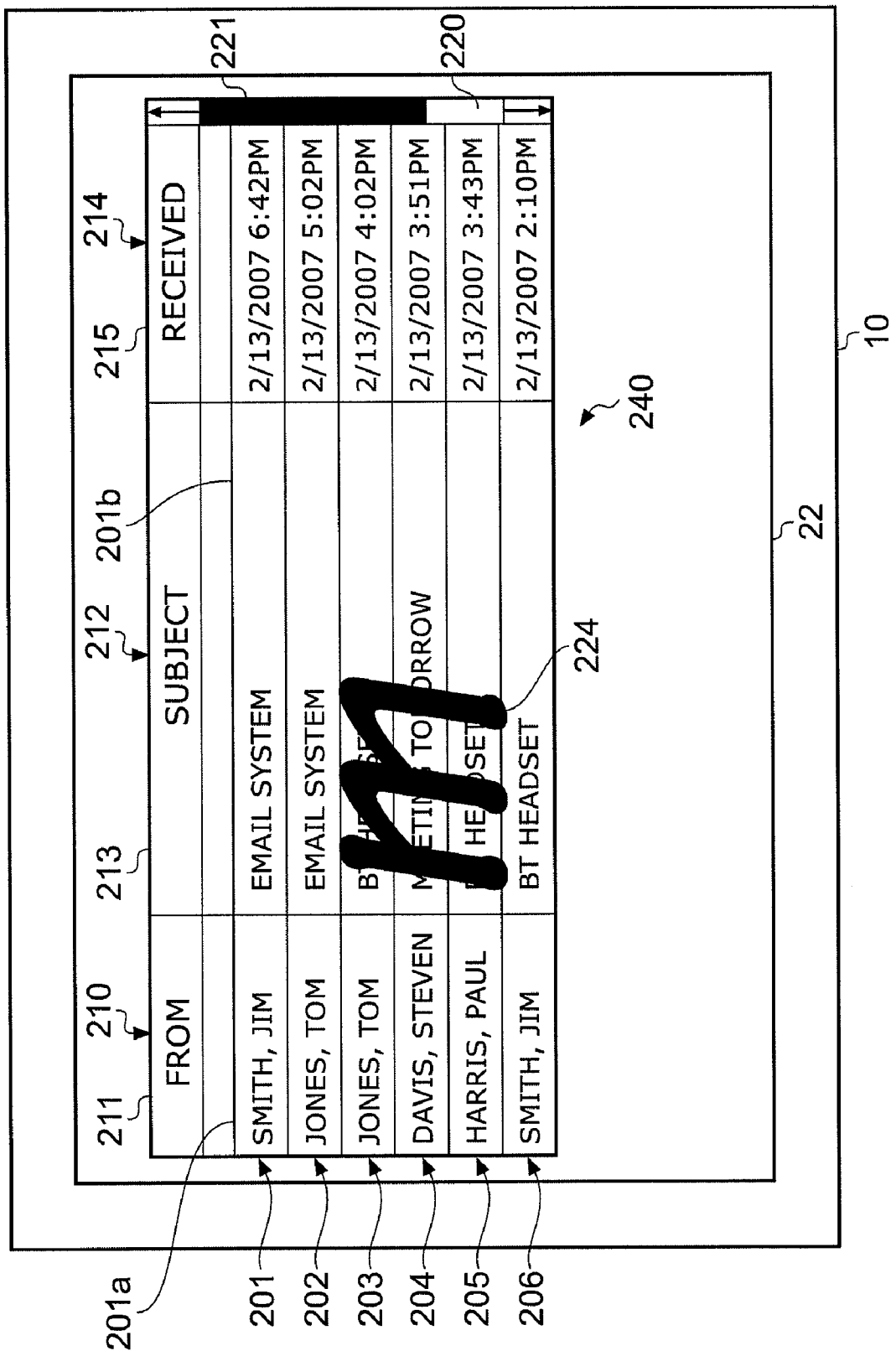
FIG. 6 illustrates writing on the touch screen display device to select a character and associate it with a field.

In the illustration provided in FIG. 6, the processing circuitry 12 is configured to detect alphanumeric characters including letters from the Latin/Roman alphabet and Arabic numerals. In this example, the user selects to input the letter "m" by drawing an "m" shape 224 on the touch screen display device 22 using a stylus or a digit. The portion of the display device 22 that the shape 224 has been drawn in corresponds to the surface area covered by box 270 in FIG. 6. The drawing of the shape 224 may or may not result in the shape 224 being displayed on the display as shown in FIG. 6.

At block 340 of FIG. 2, the processing circuitry 12 compares the detected at least one alphanumeric character with data portions in a field. At block 350 of FIG. 2, the processing circuitry 12 orders and selects a second plurality of items from the underlying list 275, and in dependence upon the comparison, controls the display device 22 to display a plurality of items in a list 240.

In response to the drawing of the shape 224 on the touch screen display device 22, the processing circuitry 12 detects the selected character by comparing the drawn shape 224 with the shape of known alphanumeric characters and determines that the shape 224 corresponds to the letter "m". The processing circuitry 12 also determines which portion of the touch screen display device 22 the shape 224 has been drawn in. In this example, the shape 224 has been drawn in the surface area covered by box 270, so the processing circuitry 12 associates the shape 224 (and therefore the determined character, which in this case is the letter "m") with the "Subject" field 212. The user has therefore simultaneously selected the character that he wishes to input and the field that he wishes to associate the selected character with.

In response to detecting the selection of a character and associating the selected character with a field, the processing circuitry 12 selects items from the underlying list 275 to be displayed in the displayed list 240. The selection depends upon a comparison between the selected character and the data portion that each item has in a particular field.

In this particular example, the processing circuitry 12 has detected the selection of the character "m" and associated it with the "Subject" field 212. This provides the processing circuitry 22 with a first criterion for ordering the items and selecting the items that are to be displayed.

As mentioned above, before the input of the character "m" by the user, the underlying list 275 is ordered according to the time and date that the items/emails 201-208 were received by the apparatus 10. In this example, the processing circuitry 12 uses the data portions 201c-208c of the items 201-208 in the "Received field" 214 (i.e. the time of receipt) as a second criterion for ordering and selecting the items following the detection of the selected character "m" and its association with the "Subject" field 212.

The processing circuitry 12 determines which items 201-208 in the underlying list 275 of items has a data portion corresponding to the character "m" in its"Subject" field 212. In this example, the processing circuitry 12 finds that items 201, 202, 204, 207 and 208 have a data portion 201b-208b corresponding to the character "m" anywhere in their respective "Subject" fields 212. In an alternative example, the processing circuitry 12 may instead determine which items have a data portion corresponding to text that begins with the character "m" in the "Subject" field 212 (e.g. item 208). Other techniques for searching could be devised, particularly for use with characters which are not alphanumeric, such as gestures.

The processing circuitry 12 then applies the second criterion to the items 201, 202, 204, 207 and 208 that fulfill the first criterion. It orders the underlying list 275 by placing all of the items 201, 202, 204, 207 and 208 that fulfill the first criterion in the order in which they were received (i.e. the second criterion), the uppermost item in the underlying list 275 being the item that was received last by the apparatus 10. The uppermost item in the re-ordered list 275 is therefore item 201, followed in descending order by items 202, 204, 207 and 208.

Items 203, 205 and 206 do not have a data portion corresponding to the character "m" in their "Subject" field 212. The processing circuitry 22 may omit these terms entirely from the display. Alternatively, the processing circuitry 22 may order these items according to the secondary criteria and place them beneath items 202, 204, 207 and 208 in the underlying list 275. Item 203 was received by the apparatus 10 before item 205, which was received before item 206. The order of the items in the underlying list 275 following the detection of the selection of the character "m" and its association with the "Subject" field 212 therefore becomes 201, 202, 204, 207, 208, 203, 205, 206. Once the new selection of the underlying list 275 is determined by the processing circuitry 12, it stores the revised underlying list 275 as data in the storage device 14.

As indicated above, in the embodiments of the invention described, the settings of the apparatus 10 and/or the size of the display device 22 means that only six items can be displayed at any one time. In a situation where the scroll tab 221 is at its uppermost location in the scroll bar 220, the processing circuitry 12 selects the six uppermost items in the revised underlying list 275 (items 201, 202, 204, 207, 208 and 203) and controls the display device 22 to display them as a list 240.

Figure 7:
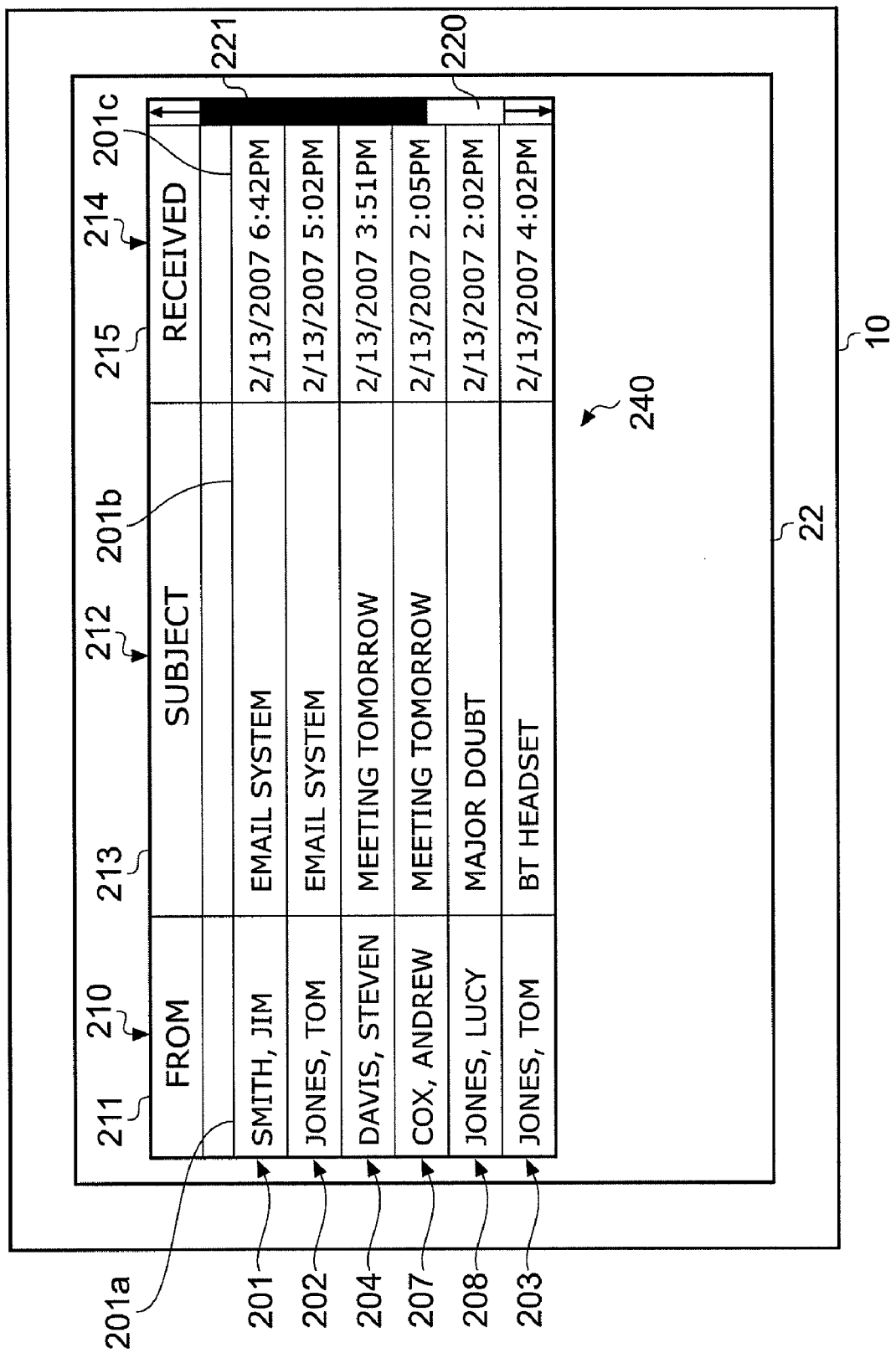
FIG. 7 illustrates the apparatus displaying a list of items in dependence upon a selected character and its associated field.

If the user moves the scroll tab 221 downwards, in the manner discussed in relation to FIGS. 3 and 4, the processing circuitry 12 may control the display to display items 205 and 206, removing items 201 and 202 from being displayed in the process. FIG. 7 illustrates the apparatus 10 displaying items 201, 202, 204, 207, 208, 203 of the re-ordered underlying list 275.

In an alternative embodiment, the processing circuitry 12 may order the items 201, 202, 204, 207 and 208 that have an "m" in their "Subject" field 212 in dependence upon the text that follows the "m" in the "Subject" field 212 (e.g. alphabetically), rather than according to the time and date that the items 201, 202, 204, 207 and 208 were received by the apparatus 10. In this embodiment, the alphabetic ordering of the text that follows the selected character(s) (in this example, "m") is the second criterion. A third criterion of the time and date of receipt may be used to establish the order of items when an order cannot be established using the first and second criteria (e.g. because items have identical subject fields). In this example, the uppermost item would be item 201, followed in descending order by items 202, 208, 204, 207, 203, 205 and 206.

In a further alternative embodiment, the processing circuitry 12 may use a different second criterion for selecting and ordering the items. For example, it may use data portions 201a-208a in the "From" field 210 as secondary criteria rather than data portions 201c-208c in the "Received" field 214. For example, the processing circuitry 12 may order the items alphabetically according to surname and/or forename. For instance, if the processing circuitry 12 orders the items according to surname (and in the case of identical surnames the forename is considered), the uppermost item of the items 201, 202, 204, 207 and 208 including an "m" in their "Subject" field 212 is 207, followed in descending order by items 204, 208, 202, 201.

The items 203, 205 and 206 that do not include an "m" in their subject field would be 205, 203, 206. These may be omitted or included after the items which do include an "m" making the order of the complete list 275 from top to bottom: 207, 204, 208, 202, 201, 205, 203, 206.

It will be apparent to the person skilled in the art that the list that is displayed on the display device 22 following the revision of the underlying list 275 may include all, some, or none of the items that were displayed before the underlying list 275 was revised, depending upon, for example, the criteria used to revise the list and the proportion of the underlying list 275 that is displayed on the display device 22 at any one time.

Figure 8:
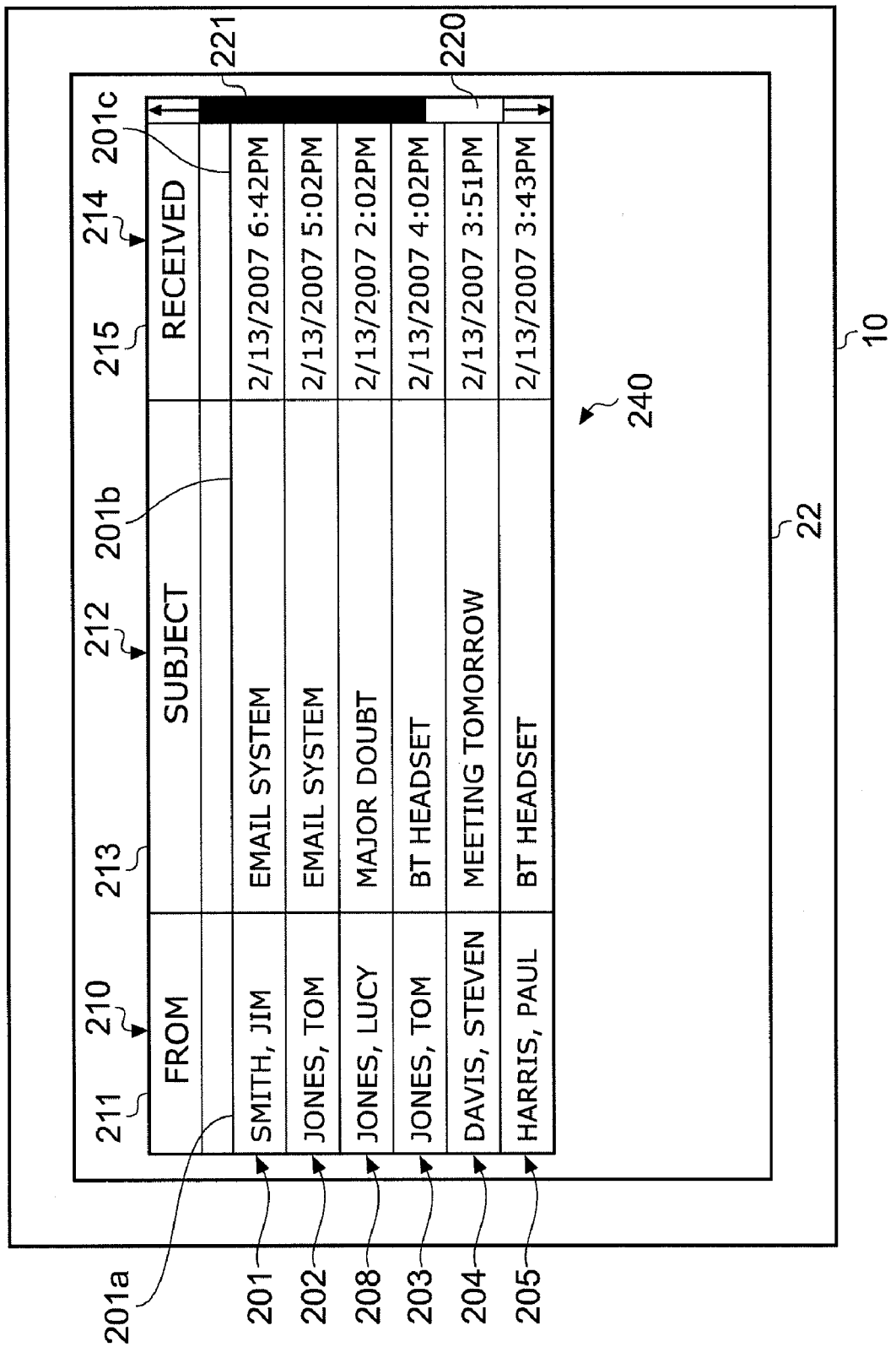
FIG. 8 illustrates the apparatus displaying a list of items in dependence upon first and second selected characters and their associated field.

FIG. 8 illustrates a situation in which the user has drawn the letters "m" and "a" on the surface area of the display device 22 corresponding to box 270, relating to the "Subject" field 212. This provides the first criterion for re-ordering the underlying list 275.

In this example, the items that have a data portion in the subject field 212 that relates to the character string "ma" (i.e. text including an "m" followed immediately by an "a") are determined by the processing circuitry 12 as being items 201, 202 and 208. The processing circuitry 12 orders the items that fulfill the first criterion according to the second criterion, which, in this example is time and date of arrival at the apparatus 10. As item 201 was received after items 202 and 208, it is the uppermost item in the re-ordered underlying list 275, followed in descending order by items 202 and 208.

The items that do not have a data portion in the subject field that relates to the text "ma" are items 203, 204, 202, 206 and 207. The processing circuitry 12 may omit these from further display, or may order these items according to the second criterion, making the order of the underlying list 275 from top to bottom: 201, 202, 208, 203, 204, 205, 206, 207. Once the revised underlying list 275 is determined by the processing circuitry 12 by selection or re-ordering, it stores the revised underlying list as data in the storage device 14. Items 201, 202, 208, 203, 204, 205 are displayed on the display device 22 when the scroll tab 221 is at its uppermost location in the scroll bar 220, as shown in FIG. 8.

In an alternative embodiment, the processing circuitry 12 may order the items 201, 202, 204, 207 and 208 that have an "ma" in their "Subject" field 212 in dependence upon the text that follows the character string "ma" in the "Subject" field 212 (e.g. alphabetically), rather than according to the time and date that the items 201, 202, 204, 207 and 208 were received by the apparatus 10. In this embodiment, the alphabetic ordering of the text that follows the selected characters (in this example, "ma") is the second criterion. A third criterion of the time and date of receipt may be used to establish the order of items when an order cannot be established using the first and second criteria (e.g. because items have identical subject fields). In this example, the ordering of the items would be the same as that illustrated in FIG. 8.

According to some embodiments of the invention, when the user draws a first alphanumeric character on the display device 22, the processing circuitry 12 responds by comparing the data portion that each item has in the field associated with the first alphanumeric character, and selecting an appropriate plurality of items from the list 275 for display in a displayed list 240. FIG. 7 illustrates a situation in which the first alphanumeric character is the letter "m", and the associated field is the "Subject" field 212.

When the user draws the second alphanumeric character on the display device 22, the processing circuitry 12 responds by comparing the data portion that each item has in the field associated with the first and second alphanumeric characters and selecting an appropriate plurality of items for display in a displayed list 240. FIG. 8 illustrates a situation in which the first and second alphanumeric characters are "m" and "a", and the associated field is the "Subject" field 212. Images of these inputs remain visible to the user, as a reminder.

Figure 9:
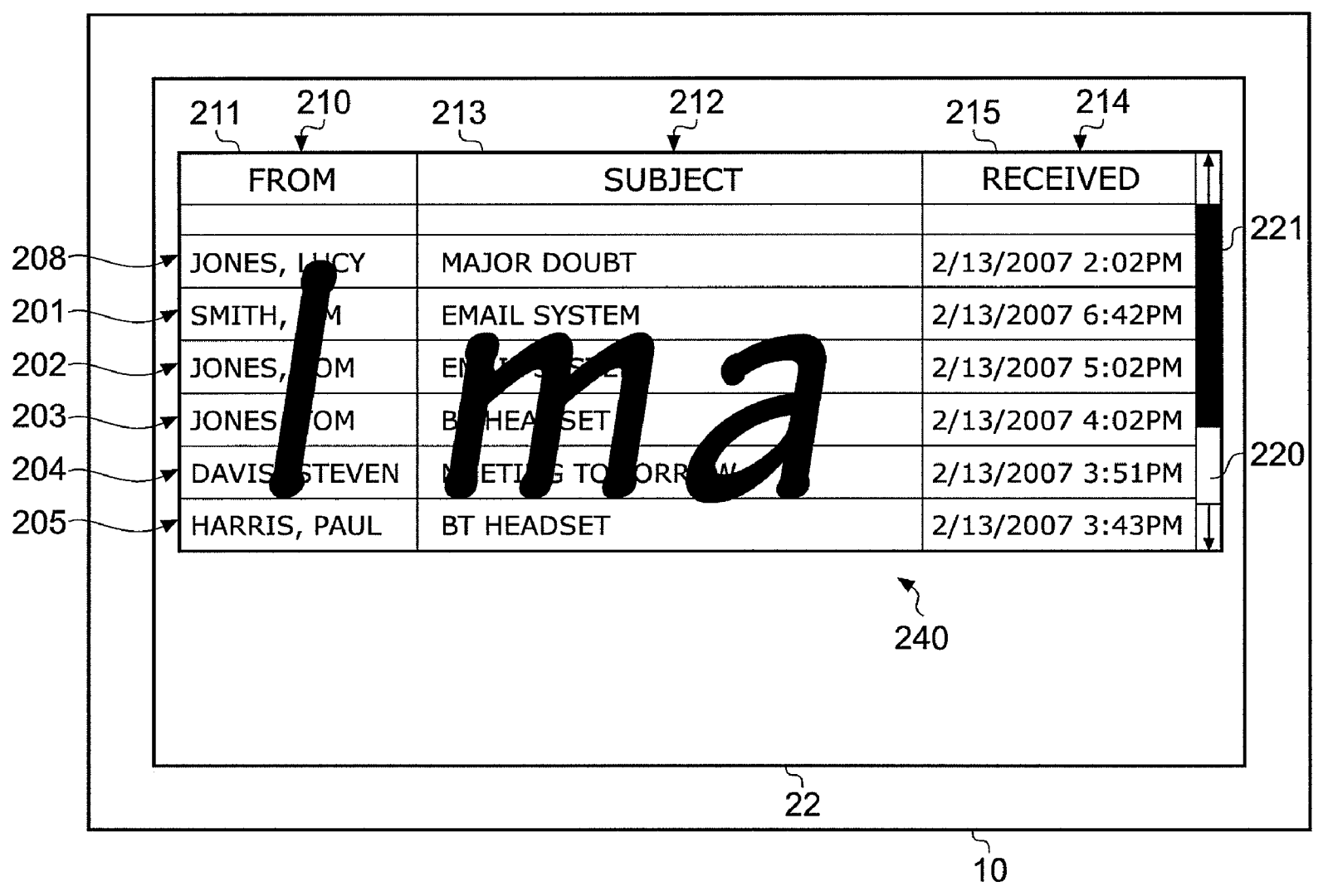

FIG. 9 illustrates a situation in which the user has drawn the characters "m" and "a" on the surface area of the display device 22 corresponding to box 270, relating to the "Subject" field 212, and has drawn the letter "l" (i.e. the lower case version of the letter "L") on the surface area of the display device 22 corresponding to box 260, relating to the "From" field 210.

In this example, the first criterion is for an item to have a data portion in the "Subject" field 213 that relates to the character string "ma" and the second criterion is for an item to have a data portion in the "From" field 211 that relates to the character "l".

The processing circuitry 12 determines that the only item that fulfills the first and second criteria is item 208. Item 208 is therefore selected as the only item for display or is placed at the top of the underlying list 275 by the processing circuitry 12.

The processing circuitry 12 also determines that items 201 and 202 provide a partial match in that they fulfill the first criterion but not the second criterion. In this example, if they are not omitted these items 201, 202 are placed in the underlying list 275 beneath item 208 by the processing circuitry 12. In the embodiment illustrated in FIG. 9, the processing circuitry 12 uses the third criterion of time and date of arrival at the apparatus 10 to determine the order that the items 201, 202 should be placed in the underlying list 275. As the item 201 was received at the apparatus 10 after item 202, item 201 is placed in the second place in the underlying list 275, above item 203. The third criterion is therefore used to determine how items that match the user's character selections to the same extent should be ordered in the underlying list 275.

Items 203, 204, 205, 206 and 207 do not fulfill the first criterion or the second criterion. If these items are not omitted, the processing circuitry 12 uses the third criterion of time and date of arrival at the apparatus 10 to determine which order the items 203 to 207 should be placed in the underlying list 275. The order of the items in the underlying list 275 in the embodiment illustrated in FIG. 9 is therefore 208, 201, 202, 203, 204, 205, 206, 207. Once the new order of the underlying list 275 is determined by the processing circuitry 12, it stores the re-ordered underlying list 275 as data in the storage device 14.

As discussed above, the settings of the apparatus 10 and/or the size of the display device 22 mean that only six items can be displayed at any one time. In a situation where the scroll tab 221 is at its uppermost location in the scroll bar 220, the processing circuitry 12 selects the six uppermost items in the underlying list 275 (items 208, 201, 202, 203, 204, and 205) and controls the display device 22 to display them in a list 240. If the user moves the scroll tab 221 downwards, in the manner discussed in relation to FIGS. 3 and 4, the processing circuitry 12 may control the display to display items 206 and 207, removing items 208 and 201 from display in the process.

In the example illustrated in FIG. 9, there are no items that fulfill the second criterion but not the first criterion. However, it will be appreciated that this may be the case in some examples. In some embodiments of the invention, the processing circuitry 12 may be configured to determine which items fulfill the first criterion or the second criterion but not both the first and second criteria, and then omit them, or order all of those items on the basis of a third criterion (e.g. time and date of arrival at the apparatus 10), irrespective of whether the first criterion or the second criterion was fulfilled.

In alternative embodiments, the processing circuitry 12 may be configured to determine which portion of the surface area of the display device 22 was drawn in first by the user, and then treat the criterion relating to that portion of the surface area to be the primary criterion. For example, in a situation where a user draws the characters "m" and "a" on the surface area of the display device 22 corresponding to box 270, and then subsequently draws the letter "l" on the surface area of the display device 22 corresponding to box 260, relating to the "From" field 211, the first criterion mentioned above is used as the primary criterion and the second criterion mentioned above is used as the secondary criterion.

If there is more than one item that fulfills the primary and secondary criteria, a tertiary criterion (e.g. time and date of receipt by the apparatus 10) is used to determine the order of the items fulfilling both the primary and secondary criteria in the underlying list 275.

Items that fulfill the primary criterion but not the secondary criterion may be omitted or positioned underneath the items that fulfill the primary and second criteria in the underlying list 275. If there is more than one item that fulfills the primary criterion but not the secondary criterion, the third criterion is used to determine the order of the items fulfilling the primary criterion but not the secondary criterion in the underlying list 275.

Items that fulfill the secondary criterion but not the primary criterion may be omitted or positioned underneath the items that fulfill the primary criterion but not the secondary criterion in the underlying list 275. If there is more than one item that fulfills the secondary criterion but not the primary criterion, the tertiary criterion is used to determine the order of the items fulfilling the secondary criterion but not the primary criterion in the underlying list 275.

Any items that do not fulfill the primary or the secondary criterion may be omitted or positioned underneath the items that fulfill the secondary criterion but not the primary criterion in the underlying list 275. If there is more than one item that does not fulfill the primary criterion or the secondary criterion, the tertiary criterion is used to determine the order of the items that do not fulfill the primary criterion or the secondary criterion in the underlying list 275.

Figure 10:
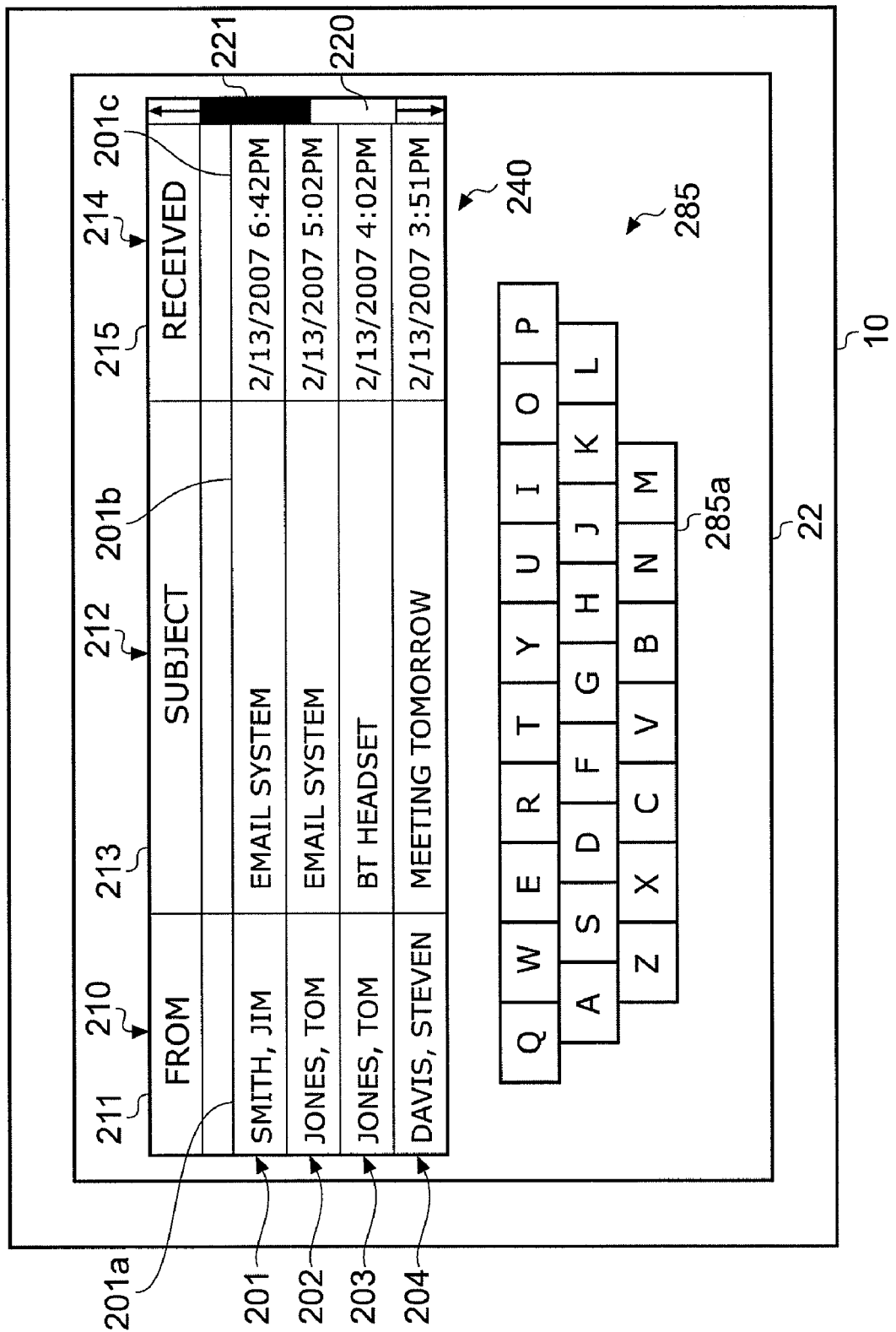
FIG. 10 illustrates the apparatus displaying a list of items and a virtual keyboard.

FIG. 10 illustrates an embodiment of the invention in which the display device 22 displays a QWERTY keyboard 285. In this embodiment, instead of or in addition to being able to draw characters on the display device 22, a user may drag an icon from the displayed keyboard to an appropriate portion of the display 22 in order to select a character for input. For example, dragging the "m" character icon 285a into the portion of the display device 22 encompassed by box 270 will cause the processing circuitry 12 to respond by controlling the display device 22 to display the list 240 illustrated in FIG. 7, in the same manner as that described in relation to FIG. 7.

In other examples, a selection of other characters, such as symbols, could be provided for user selection.

In all of these examples, the user input serves to select a character, and also to associate the character with one of the available fields. These input parameters are then used to select items from the list. This selection may be by discarding, for display purposes, all items which are not selected by the input of the characters, or by re-ordering the underlying list of items to put the selected items first in the display, or by moving to an appropriate position in a list, whose contents remain in the same order (such as to select an initial letter in an alphabetic list).

Although embodiments of the present invention have been described in the preceding paragraphs with reference to various examples, it should be appreciated that modifications to the examples given can be made without departing from the scope of the invention as claimed. For example, embodiments of the invention have been described in the context of an inbox of an email application. However, it will be apparent that embodiments of the invention may be applied in other contexts. For example, they may be applied to a "sent items" box in an email application, to an inbox or "sent items" box in a text message (SMS) application. Embodiments of the invention could also be used to search through other types of content such as music files or photographic images.

Features described in the preceding description may be used in combinations other than the combinations explicitly described.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

That which is claimed is:

1. An apparatus, comprising:
   processing circuitry; and
   at least one memory storing computer program instructions, the at least one memory and the computer program instructions configured to, with the processing circuitry, cause the apparatus to at least:
   control a display to display a first plurality of items from a list of items, each of the displayed first plurality of items having data portions displayed in a plurality of selectable fields;
   enable a user to input at least one character on one or more portions of a plurality of portions of a touch screen display device and to simultaneously, upon character input, select in dependence upon the one or more portions, at least one field, from the plurality of selectable fields, with which to associate the input at least one character; and
   control the display to display a second plurality of items, the second plurality of items being selected from the list of items, wherein the selection is in dependence upon a comparison between the at least one character input by the user and the data portions the items have in the selected at least one field.

2. An apparatus as claimed in claim 1, wherein in response to a first individual character being input by the user, the at least one memory including the computer program instructions is further configured to, with the processing circuitry, cause the apparatus to compare the data portions that the items have in the selected at least one field with the first individual character.

3. An apparatus as claimed in claim 2, wherein in response to a second individual character being input by a user, the at least one memory including the computer program instructions is further configured to, with the processing circuitry, cause the apparatus to compare the data portion that the items have in the selected at least one field with the first and second individual characters.

4. An apparatus as claimed in claim 1, wherein the at least one character is input by the user writing the at least one character on the touch screen display device.

5. An apparatus as claimed in claim 1, the at the least one character is input by selecting at least one character icon from a plurality of character icons displayed on the touch screen display device.

6. An apparatus as claimed in claim 5, wherein individual characters are input by dragging a character icon displayed on the touch screen display device from one portion of the touch screen display device to another.

7. An apparatus as claimed in claim 1, wherein the plurality of items relates to emails.

8. An apparatus as claimed in claim 1, further comprising a display.

9. A method, comprising:
   controlling a display to display a first plurality of items from a list of items, each of the displayed first plurality of items having data portions displayed in a plurality of selectable fields;
   enabling a user to input at least one character on one or more portions of a plurality of portions of a touch screen display device and to simultaneously, upon character input, select in dependence upon the one or more portions, at least one field, from the plurality of selectable fields, with which to associate the input at least one character; and
   controlling the display to display a second plurality of items, the second plurality of items being selected from the list of items, the selection being in dependence upon a comparison between the at least one character input by the user and the data portion that the items have in the selected at least one field.

10. A method as claimed in claim 9, wherein in response to a first individual character being input by the user, the data portions that the items have in the selected at least one field are compared with the first individual character.

11. A method as claimed in claim 9, wherein the at least one character is input by the user writing the at least one character on the touch screen display device.

12. A non-transitory computer readable medium storing computer program instructions that, when executed by at least one processor, cause at least the following to be performed:
   controlling a display to display a first plurality of items from a list of items, each of the displayed first plurality of items having data portions displayed in a plurality of selectable fields;
   enabling a user to input at least one character on one or more portions of a plurality of portions of a touch screen display device and to simultaneously, upon character input, select in dependence upon the one or more portions, at least one field, from the plurality of selectable fields, with which to associate the input at least one character; and
   controlling the display to display a second plurality of items, the second plurality of items being selected from the list of items, the selection being in dependence upon a comparison between the at least one character input by the user and the data portions that the items have in the selected at least one field.

13. A non-transitory computer readable medium storing computer program instructions as claimed in claim 12, wherein in response to a first individual character being input by the user, the data portions that the items have in the selected at least one field are compared with the first individual character.

14. A non-transitory computer readable medium storing computer program instructions as claimed in claim 12, wherein the at least one character is input by the user writing the at least one character on the touch screen display device.

15. A graphical user interface, comprising:
  a touch sensitive display configured to display a first plurality of items from a list of items, each of the displayed first plurality of items having data portions displayed in a plurality of selectable fields;
  wherein the touch sensitive display is further configured to enable a user to input one or more characters on one or more portions of a plurality of portions of the touch sensitive display and to simultaneously, upon character input, select in dependence upon the one or more portions, at least one field, from the plurality of selectable fields, with which to associate the input at least one character, wherein following input of the one or more characters, the touch sensitive display displays a second plurality of items, the second plurality of items being selected from the list of items and ordered in dependence upon the at least one character input by the user and the data portion that items have in the selected at least one field.

16. A graphical user interface as claimed in claim 15, wherein in response to a first individual character being input by the user, the data portions that the items have in the selected at least one field are compared with the first individual character.

17. A graphical user interface as claimed in claim 15, wherein the at least one character is input by the user writing the at least one character on the touch screen display device.

* * * * *

UNITED STATES PATENT AND TRADEMARK OFFICE
CERTIFICATE OF CORRECTION

PATENT NO. : 8,296,681 B2
APPLICATION NO. : 11/844717
DATED : October 23, 2012
INVENTOR(S) : Nurmi Page 1 of 1

It is certified that error appears in the above-identified patent and that said Letters Patent is hereby corrected as shown below:

In the Specification:

Column 9,
Line 26, "letter "l"" should read --letter "I"--;
Line 34, "character "l"" should read --character "I"--.

Column 10,
Line 26, "letter "l"" should read --letter "I"--.

Signed and Sealed this
Twenty-third Day of April, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,296,681 B2  Page 1 of 1
APPLICATION NO. : 11/844717
DATED : October 23, 2012
INVENTOR(S) : Nurmi It is certified that error appears in the above-identified patent and that said Letters Patent is hereby corrected as shown below:

In the Specification:

Column 9,
Line 26, "letter "I"" should read --letter "l"--;
Line 34, "character "I"" should read --character "l"--.

Column 10,
Line 26, "letter "I"" should read --letter "l"--.

This certificate supersedes the Certificate of Correction issued April 23, 2013.

Signed and Sealed this
Twenty-ninth Day of March, 2016

Michelle K. Lee
*Director of the United States Patent and Trademark Office*

UNITED STATES PATENT AND TRADEMARK OFFICE
CERTIFICATE OF CORRECTION

PATENT NO. : 8,296,681 B2  Page 1 of 1
APPLICATION NO. : 11/844717
DATED : October 23, 2012
INVENTOR(S) : Nurmi It is certified that error appears in the above-identified patent and that said Letters Patent is hereby corrected as shown below:

In the Specification:

Column 9,

Line 26, "letter "I"" should read -- letter "l" --;

Line 34, "character "I"" should read -- character "l" --.

Column 10,

Line 26, "letter "I"" should read -- letter "l" --.

This certificate supersedes the Certificates of Correction issued April 23, 2013 and March 29, 2016.

Signed and Sealed this
Third Day of May, 2016

Michelle K. Lee
*Director of the United States Patent and Trademark Office*